March 22, 1960 L. E. BOGGIO 2,929,187
CENTRAL DELIVERY HAY RAKE
Filed Jan. 24, 1957 4 Sheets-Sheet 1

Louis E. Boggio
INVENTOR.

March 22, 1960 L. E. BOGGIO 2,929,187
CENTRAL DELIVERY HAY RAKE
Filed Jan. 24, 1957 4 Sheets-Sheet 4

Louis E. Boggio
INVENTOR.

United States Patent Office 2,929,187
Patented Mar. 22, 1960

2,929,187

CENTRAL DELIVERY HAY RAKE

Louis E. Boggio, Roscoe, Mont.

Application January 24, 1957, Serial No. 636,040

2 Claims. (Cl. 56—27)

This invention relates to agricultural implements and more particularly to a hay rake which is adapted to be mounted on a tractor or other prime mover.

An object of the present invention is to provide a practical device which functions as a central delivery mounted hay rake that has a deflector or shield operatively arranged with a pair of rake assemblies which protrude laterally of the tractor and are preferably angulated so that upon actuation of the rake assemblies and in coaction with the deflector shield, the hay, alfalfa or other crop which is to be raked is effectively and cleanly directed inwardly toward the center of the tractor where it is formed in a windrow. This makes the crop far more easily handled by a baler or other farm equipment which is used for subsequently handling the crop.

A further object of the present invention is to provide a rake attachment for tractors which includes two generally laterally protruding rake assemblies that are preferably hydraulically lifted and lowered, the rake assemblies being fitted with means that are adjustable and which establish the working plane at which the rakes are lowered, each rake assembly being independently operated so that if the farmer should so desire, one rake may be elevated while the other is in operation at the lowered working level.

One of the principal features and objects of the invention is to provide a hay rake which will deliver centrally of the tractor on which the hay rake is mounted whereby the hay is automatically formed in a windrow.

Moreover, it is a further object of the invention to provide a practical device of this type which is capable of being mounted on any common make of farm tractor. In this way, the rake is more versatile than other presently available equipment.

A further object of the invention is to provide a rake which has a rake assembly adapted to be mounted on a tractor, the assembly consisting in an upper and lower group of tines that oscillate as the rake is in operation, together with a deflector shield which functions as a stripper to keep the hay from following the rake tines and reels and to force the hay ahead and down so that it will move off the end of the rake assembly and toward a central location. When two such rake assemblies are used a neat, orderly and proper window is formed over which the tractor passes. By correct selection of tractor and adjustment of the rakes, no part of the tractor disturbs the windrow inasmuch as it is formed between the tread of the wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is an enlarged sectional view of one of the crazy wheels and taken approximately on the line 7—7 of Figure 1, the view showing principally the means operatively connected with the crazy wheel in order to provide an anti-shimmy device for the wheel;

Figure 8 is a sectional view of the drive for one of the rake assemblies taken substantially along the plane 8—8 of Figure 2;

Figure 9 is a sectional view taken on the line 9—9 of Figure 2 and showing principally the means to establish the lower level for the rake assemblies in their operative positions, these means being adjustable, and;

Figure 10 is a front view of one of the rake assemblies and shows principally the deflector shield which operates as a stripper for the tines of the rake and which directs the raked hay or other crop downwardly and inwardly to form a windrow at the longitudinal center of the attachment.

Figure 5:
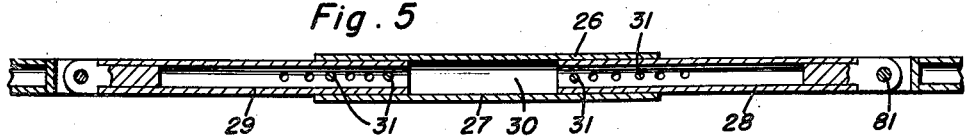
Figure 5 is an enlarged sectional view taken on a line 5—5 of Figure 1 illustrating the adjustment fitted in the frame of the attachment whereby it may be used to fit various types of tractors and to fit in various positions on the same tractors.

In the accompanying drawings there is a tractor 10 of purely conventional construction and includes along the other necessary parts of the tractor, a power take-off having shaft 12, four wheels 13, 14, 15, and 16, rear axle housings 17 and 18 mounted on a tractor chassis with which the frame 20 of the rake 22 is secured. Rake 22 is constructed in accordance with the principles of the invention and has the frame 20 made of sides 23 and 24 together with a front transverse cross member 26. The transverse cross member 26 (Figure 5) is made of a sleeve 27 having rods 28 and 29 extensibly positioned in the bore 30 thereof and held in place by means of bolts 31, pins or other quick disconnect means. When bolts are used they are passed through aligned openings in the sleeve 27 and in the rods 28 and 29 so that the effective length of the cross member 26 to fit a particular tractor is obtainable. The front ends of the sides 23 and 24 are welded or otherwise rigidly fixed to the rods 28 and 29 of the cross member and the back ends of the sides 23 and 24 are connected by clamps 33 and 34 to the rear axle housings 17 and 18. Mounting brackets 35 and 36 which protrude laterally from sides 23 and 24 are bolted or otherwise secured to the frame of the tractor or to the front drawbar thereof depending upon the type of tractor 10 that is used. An arched support 38 which is also adjustable in the manner similar to the adjustment achieved by front cross member 26 is attached to the sides 23 and 24 of the frame 20 and is adapted to extend over the tractor, lending support and rigidity to the frame but yet enabling it to be adjusted to suit the varying width of different tractors.

Two rake assemblies 40 and 41 are carried by the frame 20, the assemblies protruding laterally of the frame 20 and therefore, protruding laterally from the sides of the tractor. It is preferred that the rake assemblies be angled rearwardly slightly toward the rear part of the tractor so that the raked hay is directed inwardly as it is directed rearwardly in response to forward motion of a tractor through a field. Each assembly is identical in construction. Accordingly, assembly 41 is described in detail. It is made of a curved end 101 on the rake frame 42 to which is attached a link 162 with two pivots 43 and 44. The upper beam 99 has a part 45 which protrudes downwardly at its end and which supports a caster wheel 46. The caster wheel 46 is made of a wheel carried on fork 48 (Figure 7) and having a spindle 49 rising therefrom. This spindle is held captive in a casing 50 but is capable of oscillation about a vertical axis. It is preferred that the spindle be mounted on ball bearings 51 or other high quality anti-friction bearings. The rear extending plate 52 is secured to the fork 48 and freely slides between the lower surface of plate 53 on casing 50 and bottom plate 56. Bolt 54 is passed through aligned holes in plate 53 and bottom plate 56 as well as spacer 58. Spring 59 is on a shank of the bolt between the end thereof and plate 53, and there is a nut on the lower extremity of the bolt. This functions as an anti-shimmy device for the caster wheel.

A stabilizing wheel 63 is mounted for rotation on a spindle that is carried by fork 64. The fork is supported behind the junction of legs 65 and 65a which are welded or otherwise secured to the beam 42.

Figure 1:
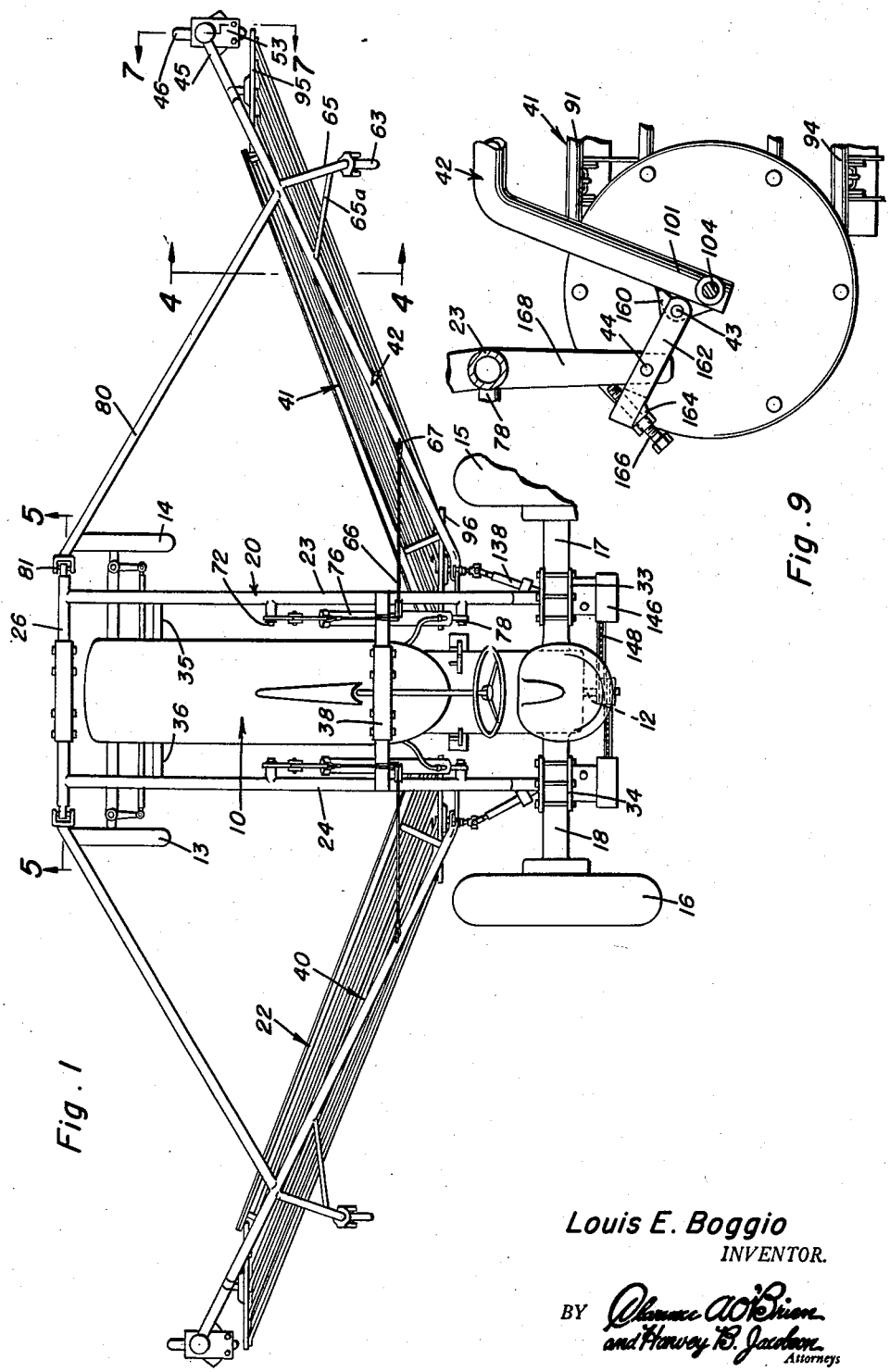
Figure 1 is a fragmentary top view with parts broken away of a tractor fitted with a rake which is constructed in accordance with the invention and showing the rake in the down, operative position.
Figure 2:
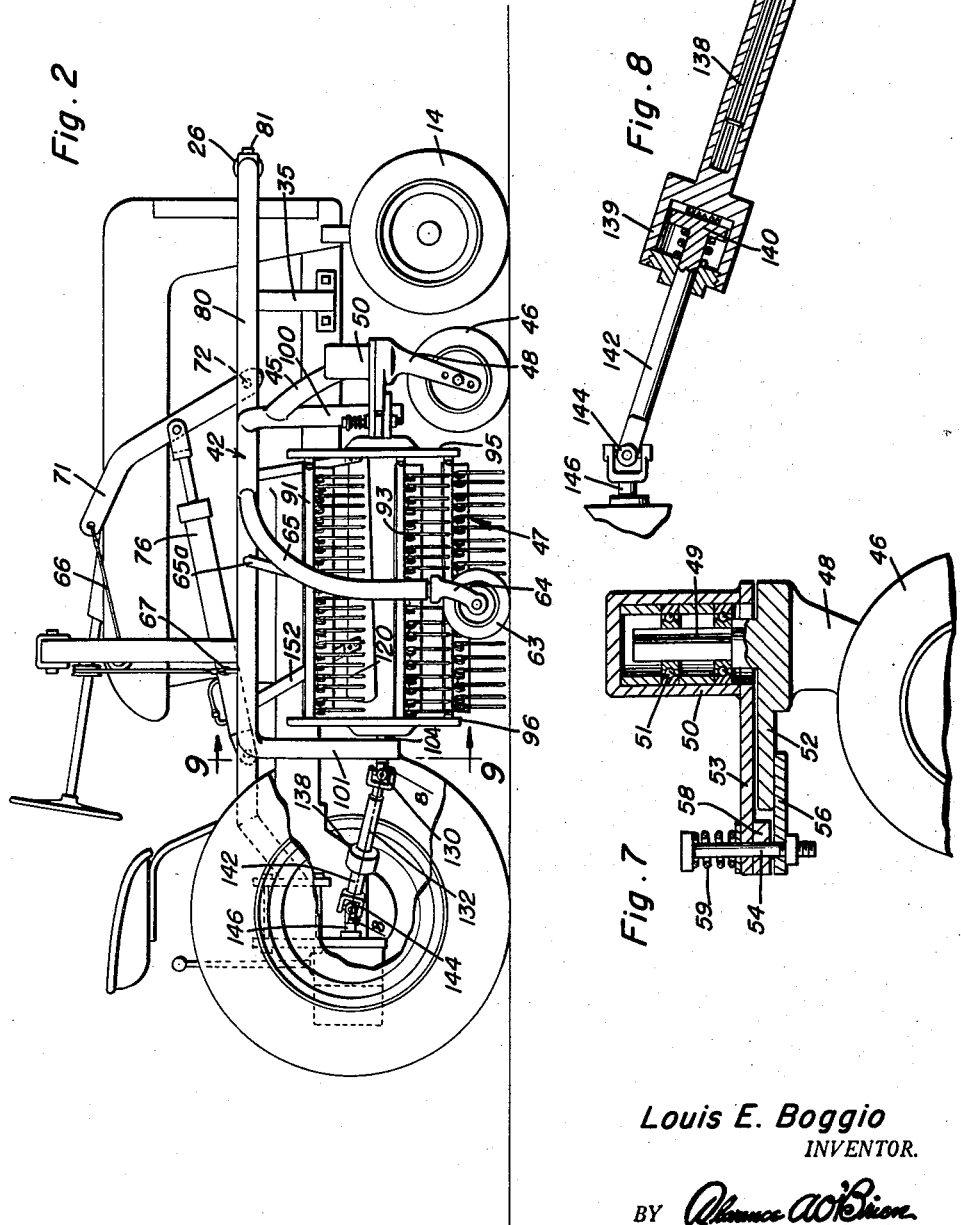
Figure 2 is a side view with parts broken away of the tractor and rake in Figure 1.

The rake assembly 41 is lifted and lowered by means of a cable 66 which is attached at one end to an eye 67 on upper beam 99 of frame 42 and which is entrained over an idler pulley 68 carried by brace 38. The cable is entrained around another guide pulley 69 also carried by the transverse arched support 38 and is attached to a lever 71 (Figure 2) whose lower end is pivoted as at 72 to the side 23 of frame 20. Hydraulic motor 76, in the form of a hydraulic cylinder and piston assembly, is connected at one end to a lever 71 intermediate the ends of the latter, and connected at the other end by a pivotal support 78 to the side 23 of frame 20. The standard hydraulic power take-off and controls on the tractor are used for actuating the fluid motor 76 whereby to lift or permit the rake assembly 41 to be lowered. Guide arm or brace 80 is attached at one end to the beam 99 between the ends thereof and connected by a pivotal connection 81 to the extremity of the front transverse frame member 26.

Figure 4:
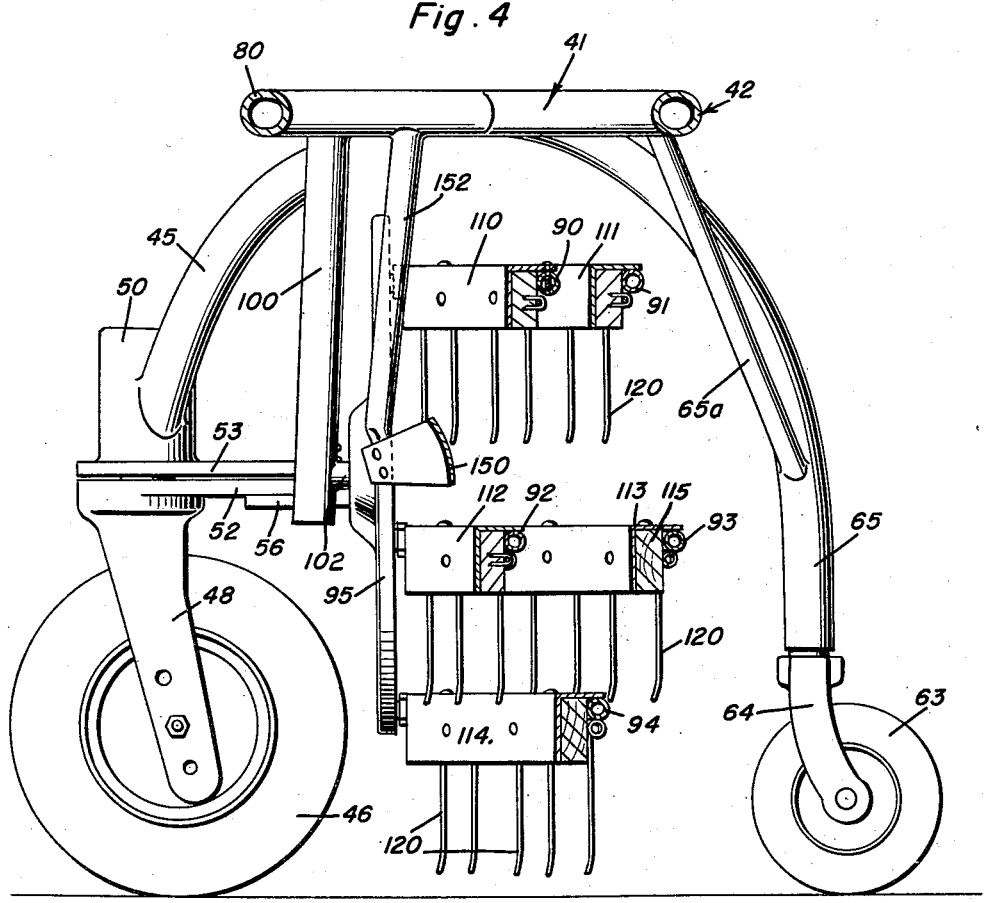
Figure 4 is a sectional view in an enlarged scale taken on the line 4—4 of Figure 1 and showing principally a cross section of one of the rake assemblies.
Figure 6:
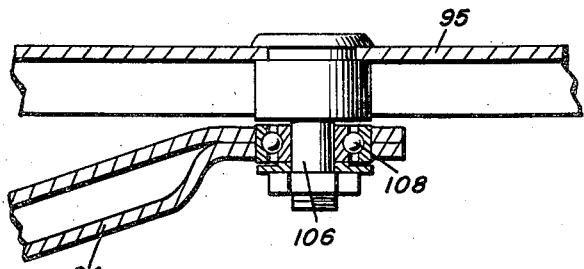
Figure 6 is an enlarged sectional view taken on a line 6—6 of Figure 3 and showing a suggested means to connect one of the beams of the rake assembly to the disk that imparts oscillatory motion thereto.

Rake assembly 41 is made of a plurality of rakes which are adapted to be rotated in response to rotation of the power take-off shaft 12. Five supports 90, 91, 92, 93 and 94 are each pivoted to a rotary disk 95 at the outer end of the beam 99 and are pivoted at their inner ends to a rotary disk 96 at the opposite end of beam 42. The rotary disks are held in place by hangers 100 and 101 and are mounted for rotation on their individual spindles 102 and 104 respectively. Figure 6 is an illustration of one way which support 94 is attached to the disk. Spindle 106 is passed through an opening in the disk 95 and has an anti-friction bearing 108 thereon. This anti-friction bearing supports the end of support 94, there being a similar bearing connection at the opposite end connecting support 94 to the disk 96. The same holds true for each of the supports 90, 91, 92 and 93, it being noted that they are bent outwardly (Figure 4) so as not to interfere with each other when the disks 95 and 96 are rotated.

In addition, the five supports have angles 110, 111, 112, 113 and 114 attached thereto, as by spot welding, and there are wooden planks 115 thereunder. The tines 120 are attached to the wooden planks and extended downwardly.

Figure 3:
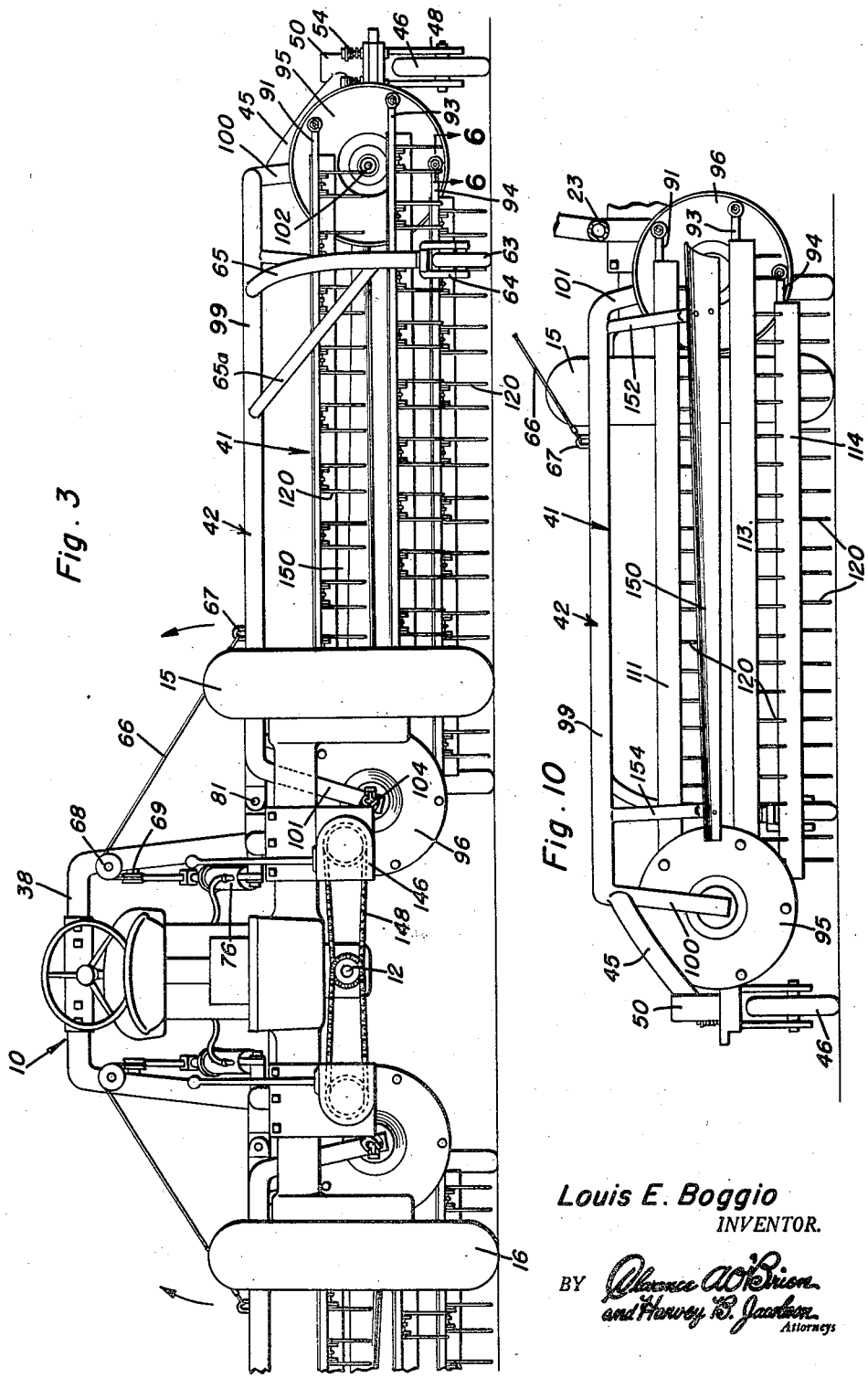
Figure 3 is a rear view fragmentarily showing the structure in Figure 1.

Rotary motion is imparted to the disk 96 by rotating spindle 104 to which the rotary disk 96 is fixed. Universal joint 130 is connected to the outer extremity of the spindle 104 and has a drive shaft 132 secured thereto. The drive shaft is constructed of a telescoping section 138 but has a housing 139 thereon, this housing constituting a part of a spring loaded overriding clutch 140 to which the shaft section 142 is attached. The universal joint 144 connects the shaft section 142 to a gear box shaft 146, the latter deriving its motion from chain 148. The chain 148 (Figure 3) is driven off a sprocket that is keyed or otherwise secured to the power take-off shaft 12. Since the supports 90, 91, 92, 93 and 94 not only function as such for the tines of the rake but also, they function as pitmans in that they drive the rotating disk 95. In so doing the supports travel in an oscillatory path and cause a raking operation.

One of the important features of the invention is seen best in Figure 10. There is a deflector shield 150 which is slightly curved in cross section (Figure 4) and which is carried by hangers 152 and 154 that depend from the beam 142. The deflector is located at approximately the axis of rotation of the two disks 95 and 96 and has its steepest pitch part at the inner extremity of the rake assembly 41. The deflector shield 150 serves two functions. The first is to direct or aid in directing the crop downward and inward of the longitudinal axis of the tractor as it is propelled through a field. The second function of the deflector 150 is to strip the tines 120, keeping them clean or essentially clean during the operation of the rake throughout a field.

Reference is now made to Figure 9, this figure showing that in front of gear box 146 there is an ear 160 that is welded on the hanger 101 near the lower end thereof. Link 162 is pivoted to the ear 160 and supports a threaded collar 164 at the end thereof in which there is a bolt 166. This bolt functions as a stop which contacts depending stop 168 that is welded to the side 23 of the frame 20. The function of the assembly shown in Figure 9 is to provide a lower operating level at which the rakes automatically stop when they are permitted to be gravity lowered or when they are lowered by positive hydraulic force depending on the type of hydraulic system that is used for actuating the rake assemblies. By adjusting the screw 166 the actual height of the rake assemblies which is the lowermost position, may be adjusted.

In operation the tractor frame 20 is fitted on both sides with rake assemblies as at 40 and 41, each being identical. Then when the tractor is propelled through the field, the supports are caused to oscillate as described previously thereby raking the hay inwardly into a window and beneath the tractor. The rake assemblies are maintained clean at all times by the deflector 150. It is apparent that the rake is very easily handled and manipulated both to and from the field and while in the field. Moreover, it will do a job very effectively, arranging the hay automatically in a window while it is being raked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a rake attachment for a tractor having a longitudinal axis, the combination of a frame attachable to a tractor, a pair of beams pivotally attached about a horizontal axis to said frame and extending toward the front of said frame at their free ends, first rotatable disks supported from each of said beams, driving means connected to said first disk for imparting rotational motion thereto, second rotatable disks supported from each of said beams, said disks being transversely spaced relative to said longitudinal axis, said disks supported to rotate in a vertical plane having a rotational axis parallel to said longitudinal axis, a plurality of supports pivotally and eccentrically maintained between said disks of respective beams, a deflecting shield mounted in juxtaposition to said supports, tines carried by said supports for moving hay to form a window, and hydraulic means connected to said beams for pivoting said beams about a horizontal axis for selectively moving said beams between an operative and an inoperative position, stops on said beams for limiting the pivotal movement of said beams about said horizontal axis.

2. The combination of claim 1 wherein said stops include a link attached to said beam, said link having a threaded aperture therein, and a bolt within said apertures adapted to contact a portion of said frame for adjustably limiting pivotal movement of said beam.

References Cited in the file of this patent

UNITED STATES PATENTS

| | | |
|---|---|---|
| 39,655 | Hubbell | Aug. 25, 1863 |
| 852,269 | Grant | Apr. 30, 1907 |
| 1,096,043 | Lomen | May 12, 1914 |
| 1,115,732 | Parry | Nov. 3, 1914 |
| 1,272,617 | Burgess | July 16, 1918 |
| 1,291,392 | Burgess | Jan. 14, 1919 |
| 1,336,065 | Bowers | Apr. 6, 1920 |
| 1,750,033 | White | Mar. 11, 1930 |
| 1,877,770 | Larson | Sept. 20, 1932 |
| 2,597,828 | Spurlin | May 20, 1952 |
| 2,639,575 | Richey | May 26, 1953 |
| 2,643,505 | Harper et al. | June 30, 1953 |
| 2,731,782 | Mason | Jan. 24, 1956 |